United States Patent

Noga

[11] Patent Number: 5,257,211
[45] Date of Patent: Oct. 26, 1993

[54] ADJUSTABLE BANDWIDTH CONCEPT (ABC) SIGNAL ENERGY DETECTOR

[75] Inventor: Andrew J. Noga, Rome, N.Y.

[73] Assignee: The United States of America as represented by the Secretary of the Air Force, Washington, D.C.

[21] Appl. No.: 702,553

[22] Filed: May 20, 1991

[51] Int. Cl.$^5$ .............................................. G01C 25/00
[52] U.S. Cl. .................... 364/571.04; 364/554; 342/91
[58] Field of Search ................ 364/517, 554, 571.04; 342/196, 91

[56] References Cited

U.S. PATENT DOCUMENTS

| | | | |
|---|---|---|---|
| 2,848,713 | 8/1958 | Cowart et al. | 342/91 |
| 4,047,172 | 9/1977 | Bauer et al. | 342/91 |
| 4,070,675 | 1/1978 | Daniel et al. | 342/91 |
| 4,431,993 | 2/1984 | Van Der Mark | 342/91 |
| 4,527,159 | 7/1985 | Bergman | 342/91 |
| 5,132,688 | 7/1992 | Shimh et al. | 342/91 |

Primary Examiner—Jack B. Harvey
Assistant Examiner—Thomas Peeso
Attorney, Agent, or Firm—William Stepanishen; Donald J. Singer

[57] ABSTRACT

An adjustable bandwidth signal energy detector apparatus utilizing a detector processor to process serial frequency data to determine which of N frequency bins contain signal energy. The serial frequency data is processed through a series of low pass filters, each of which include a series of point delay. The data from each point delay series is summed and outputted to a detection combiner wherein a sequence of N binary number is generated.

5 Claims, 5 Drawing Sheets

ADJUSTABLE BANDWIDTH CONCEPT (ABC) SIGNAL ENERGY DETECTOR

STATEMENT OF GOVERNMENT INTEREST

The invention described herein may be manufactured and used by or for the government for governmental purposes without the payment of any royalty thereof.

BACKGROUND OF THE INVENTION

The signal energy detector is a basic component of several processing techniques which the Air Force through RADC has investigated and developed, that detect signals in the RF spectrum and also determine their signal-to-noise ratio (SNR), bandwidth (BW), and center frequency. This collection of algorithms/processing techniques, which were developed during the 70's and 80's, are called the Automatic Intercept Device (AID) and the Automatic Intercept Module (AIM), versions 1 and 2.

The energy detectors used in these techniques are typically designed to achieve a constant false-alarm rate (CFAR) performance. This is realized by assuming the probability density function of the noise present in a particular frequency band is known, and making a detection decision given the probability that this detection was caused by noise only. The detection threshold is set based upon the desired probability of false alarm, $P_F$, probability of detection, $P_D$, and the minimum required SNR.

The input to the detectors used in AID, AIM1 and AIM2 is an array of complex numbers representing the frequency content of a chosen frequency band of interest. This array is generated using a fast Fourier transform (FFT) with an appropriate data window (e.g., Hanning, Hamming, etc.). The time data is typically obtained from either a single channel of a channelized receiver, or the Intermediate Frequency (IF) output of a superheterodyne receiver. This IF output is bandlimited, downconverted to baseband, lowpass filtered to prevent aliasing, amplified and finally digitized by an analog-to-digital (A/D) converter. The AID and AIM1 detectors operate on the magnitude squared of the individual frequency bins of the FFT, known as the periodogram. In addition to using the periodogram or auto-power spectrum, the AIM2 technique also uses the cross-spectrum power for performing detection. To generate the cross-spectrum, a second parallel channel consisting of antenna and receiver through A/D converter is needed. This second channel must be matched in amplitude and phase response to the first channel with a known antenna spacing. Since the AIM2 technique is a dual channel system, it will not be described in further detail. The AID and AIM1 techniques are single channel techniques and as such will be elaborated upon.

There is shown in FIG. 1 is the generalized form of the AID detection scheme based on a N-point FFT, where the weighted average of K power spectral density estimates (periodograms) is taken. The purpose of the weighted average is to take into account noise level fluctuations from one N-point block of spectral data to the next. The weights are determined by calculating a noise level estimate for each periodogram and scaling or normalizing all of the frequency bins in proportion to this estimated noise level. This is done for each of the K periodograms prior to taking their average. The logarithm of this average is taken and another noise level estimate is made using this average. A threshold level is determined based on this noise level estimate and the desired $P_D$ and $P_F$. Finally, each frequency bin of the averaged set of K periodograms is compared against this threshold in deciding whether there is signal activity (energy) in a particular bin. Typically the rank-select-threshold (RST) technique is used in estimating the noise level in the spectral estimate, although any single channel noise estimation technique can be used.

The main limitation of the AID signal energy detection technique arises from averaging K periodograms. Averaging is desirable since it reduces the variance (by an amount proportional to k/K) of the power spectral estimate obtained using the periodogram. The two main disadvantages are:

a) An undesirable time delay exists between the start of the FFT process and the output of the threshold comparison mainly caused by the averaging process. For example, if it takes 0.5 milliseconds (mS) to calculate a single N-point FFT and if 10 averages are taken, it will take a minimum of $10 \times 0.5 = 5.0$ mS to generate a detection report.

b) Signals which turn on and off rapidly and remain off or switch to another frequency can potentially be averaged out by the AID detection scheme and as a result not be detected at all. As an example, if the A/D sample rate is 4.096E+6 Samples/sec and the FFT size, N, is 4096 points, then the amount of time per FFT dwell is 4096 / 4.096E+6 = 1.0 mS. For a signal which turns on for less than 1 mS and off for greater than K mS (K being the number of averages) the averaging will tend to suppress the signal energy, causing it to not be detected.

In FIGS. 2a, b and c there is shown the AIM 1 detection scheme as described in reference 2. Like AID, AIM1 is based on a N-point FFT used to form the periodogram as the spectral estimate. Although it is not discussed herein a weighted average could be incorporated into the technique.

The AIM1 technique uses the mode estimation technique for estimating the noise level in the spectral estimate. This noise estimate is used by the multiple threshold selection unit section to help establish the thresholds used by the detection processor unit. As with AID, any single channel noise estimation technique can be used. The noise estimate is used to establish a CFAR performance for each detector in the detection processor unit. Overall this results in a $P_F$ which is greater than that of the individual detectors. The operation of the AIM1 detection processor unit is shown in further detail in FIG. 2b. To improve the detection of wide bandwidth signals a bank of detectors is used which operates on multiple adjacent FFT bins. Each detector is the same in form but different with regard to how many frequency bins each detector averages, thus each detector has a different bandwidth (BW). The first detector, BW1, processes one bin at a time, the second detector, BW2, processes 3 bins at a time, the third detector, BW3, processes 5 bins, etc., until the widest bandwidth detector, BWN, makes a decision based on the whole spectrum which is made up of N frequency bins. In this case, the binary sequence (1,2,4,8, . . . ) was chosen for the sequence of detector widths although any reasonable number sequence could be used. The number sequence was forced to be odd, by adding 1 to the even numbers in the sequence, solely for the purpose of easing software proof-of-concept. As with averaging sets of consecutive spectral estimates, averaging multiple consecutive bins within a single estimate increases the time-bandwidth product of the detector and hence improves detector performance.

Once detections have been made, the results of the individual detectors must in some way be combined to form the resultant output of the AIM1 detection processor. For AIM1 the combination technique of FIG. 2c is used. This technique gives precedence to the detections which occurred in the narrower bandwidth detectors. Note that using this combination technique, it is computationally more efficient to postpone the frequency bin averaging in a particular detector (e.g. BW2) until detection has been completed in the more narrow bandwidth detectors (e.g. BW1). In this way, only the frequency bins not yet found to have signal energy need to be averaged. Finally, the detection results of each of the varying bandwidth detectors are summed (logically OR'd) to form the signal detections. Other combination techniques such as simply performing a logical OR directly on the detection outputs of each of the detectors, BW1 through BWN, could also be used.

Returning to FIG. 2a, the final stage of the AIM1 detector is the detection modifier unit. After signal energy detector is completed by the detection processor unit, the remaining portions of the spectrum should theoretically be noise. AIM1 checks for this condition in the mean-variance verifier unit using the mean-variance power detector technique. If the mean-variance detector decides that the supposed noise bands are not noise, then the detection modifier unit concludes that a noise floor must not have been present in the spectrum. In this case the entire spectrum is declared to contain signal. On the other hand, the mean-variance verifier unit may indicate that the original noise floor estimate was too high, possibly causing signal energy to be missed. In this case the detection thresholds can be lowered and, time permitting, the spectral data can be re-processed by the detection processor unit. As a minimum, an operator can be alerted to this desensitization caused by an incorrectly high noise floor estimate.

Although AIM1 may constitute a performance improvement over AID in terms of probability of false alarm, probability of detection and required SNR, AIM1 still suffers from the same limitations as AID. Namely:

a) An undesirable time delay between the start of the FFT process and the final output of the detection modifier unit, mainly caused by the averaging K blocks section.

b) Averaging out signal transitions of short time duration. In addition to these, AIM1 also suffers from:

c) A tendency to under estimate a signal's bandwidth.

This is caused by the AIM1 detection combiner unit which gives precedence to narrowband signals to prevent exaggerating the bandwidth. AIM1 therefore requires some form of bandwidth-expander to compensate for detecting small bandwidths.

SUMMARY OF THE INVENTION

The present invention utilizes a detection processor/combiner unit to process frequency data from a parallel to serial converter unit. The frequency information which is applied to the parallel to serial converter consists of N discrete frequency "cells" representing the frequency band of interest. The parallel to serial converter outputs the data in serial form ordered from the lowest frequency to the highest at a rate equal to N times that of its input. The serial frequency data is used by the detection processor/combiner circuits with information generated by the multiple threshold selector circuits to determine which of the N frequency bins contain signal energy. Thus, the output of the detection processor combiner is a sequence of N binary numbers, one for each frequency bin with a 1 indicating the presence of signal energy and an 0 indicating noise only. For each N-point periodogram, the device will generate an N-point of set binary numbers which indicate where signal energy has been detected.

It is one object of the present invention, therefore, to provide an improved adjustable bandwidth concept signal energy detection apparatus.

It is another object of the present invention to provide an improved adjustable bandwidth concept signal energy detection apparatus wherein the averaging of consecutive FFT's is done in a selective fashion such that detection decisions for wider bandwidth signals can occur independently of narrower bandwidth signal detections.

It is yet another object of the present invention to provide an improved adjustable bandwidth concept signal energy detection apparatus wherein wider bandwidth signals can be averaged more over frequency and less over time.

It is still another object of the present invention to provide an improved adjustable bandwidth concept signal energy detection apparatus wherein narrower bandwidth signals can be averaged more over time and less over frequency.

It is yet another object of the present invention to provide an improved adjustable bandwidth concept signal energy detection apparatus wherein only the minimal amount of time delay will be generated between the start of the FFT process and the generation of a detection decision.

These and other advantages, objects and features of the invention will become more apparent after considering the following description taken in conjunction with the illustrative embodiment in the accompanying drawings.

DETAILED DESCRIPTION OF THE PREFERRED EMBODIMENT

Figure 3A:
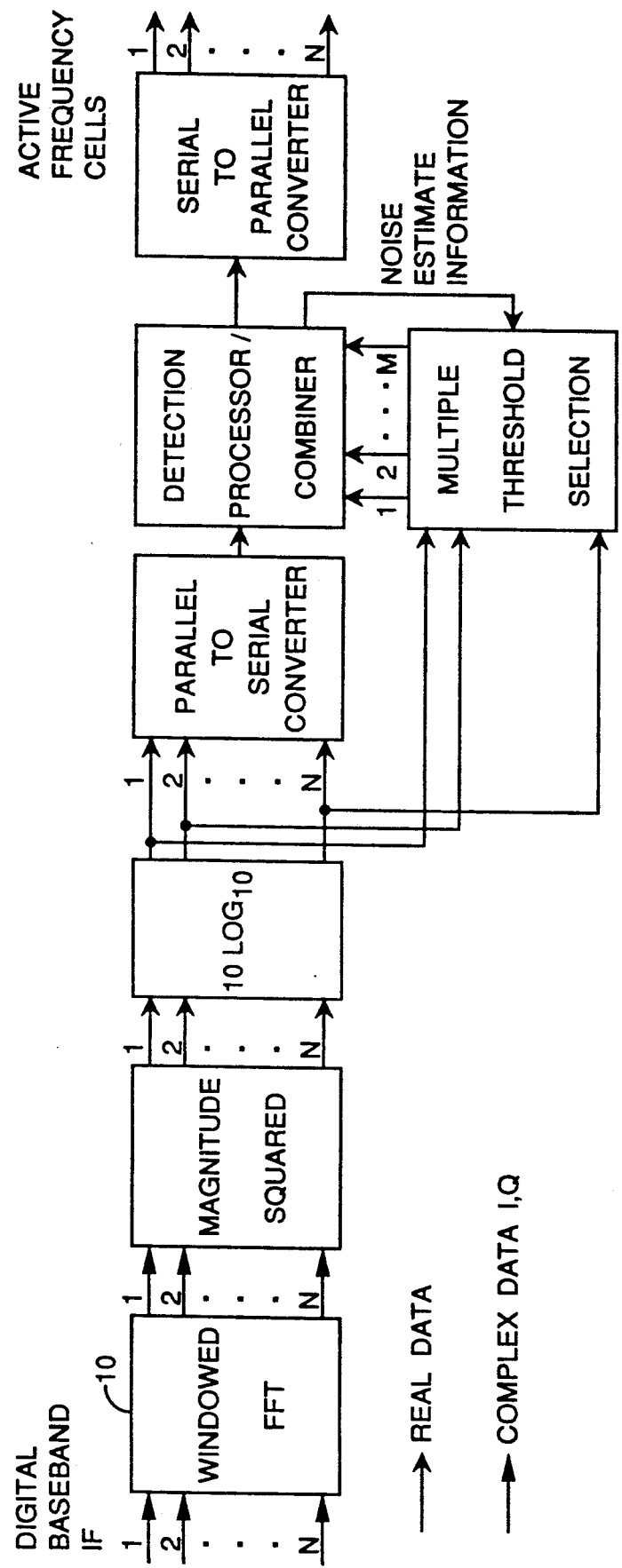
FIG. 3a is a block diagram of the adjustable bandwidth concept signal energy detector apparatus according to the present invention.

Referring now to FIGS. 3a and b there is shown a block diagram of the adjustable bandwidth concept detection apparatus. As with the AID and AIM1 techniques, adjustable bandwidth concept apparatus is based on a N-point windowed FFT unit 10 which is used to form the periodogram which is used as the power spectral estimate. The adjustable bandwidth concept apparatus processes sequential sets of N-point power spectral estimates where N is constrained by the FFT algorithm to be a power of 2 (e.g. 512, 1024, etc.). For maximum efficiency, the time signal data applied to the FFT must be the complex envelope of the frequency band of interest. One possible technique for generating the complex envelope is to use a quadrature downconverter, however any efficient technique for generating this complex time signal can be used.

The frequency information which is applied to the parallel to serial converter unit comprised of N discrete frequency "cells" representing the frequency band of interest. The cells range in frequency from 0 Hz to $F_s(1-1/n)$ Hz, where $F_s$ is the sample rate at which the original analog time signal has been digitized. Thus the size of each frequency cell or bin is $F_s/N$. The data presented to the parallel to serial converter unit is therefore the amplitude in decibels above 1 milliwatt (dBm) of the energy in each of the frequency bins. The parallel to serial converter unit outputs the data in serial form ordered from lowest frequency to highest and at a rate equal to N times that of its input.

This serial frequency data is used by the detection processor/combiner in combination with threshold information generated by the multiple threshold selector unit, to determine which of the N frequency bins contain signal energy. Thus the output of the detector processor/combiner unit is a sequence of N binary numbers, one for each frequency bin, with a 1 indicating the presence of signal energy and an 0 indicating noise only. For each N-point periodogram, adjustable bandwidth concept apparatus will generate an N-point set of binary numbers which indicate where signal energy has been detected.

Figure 3B:
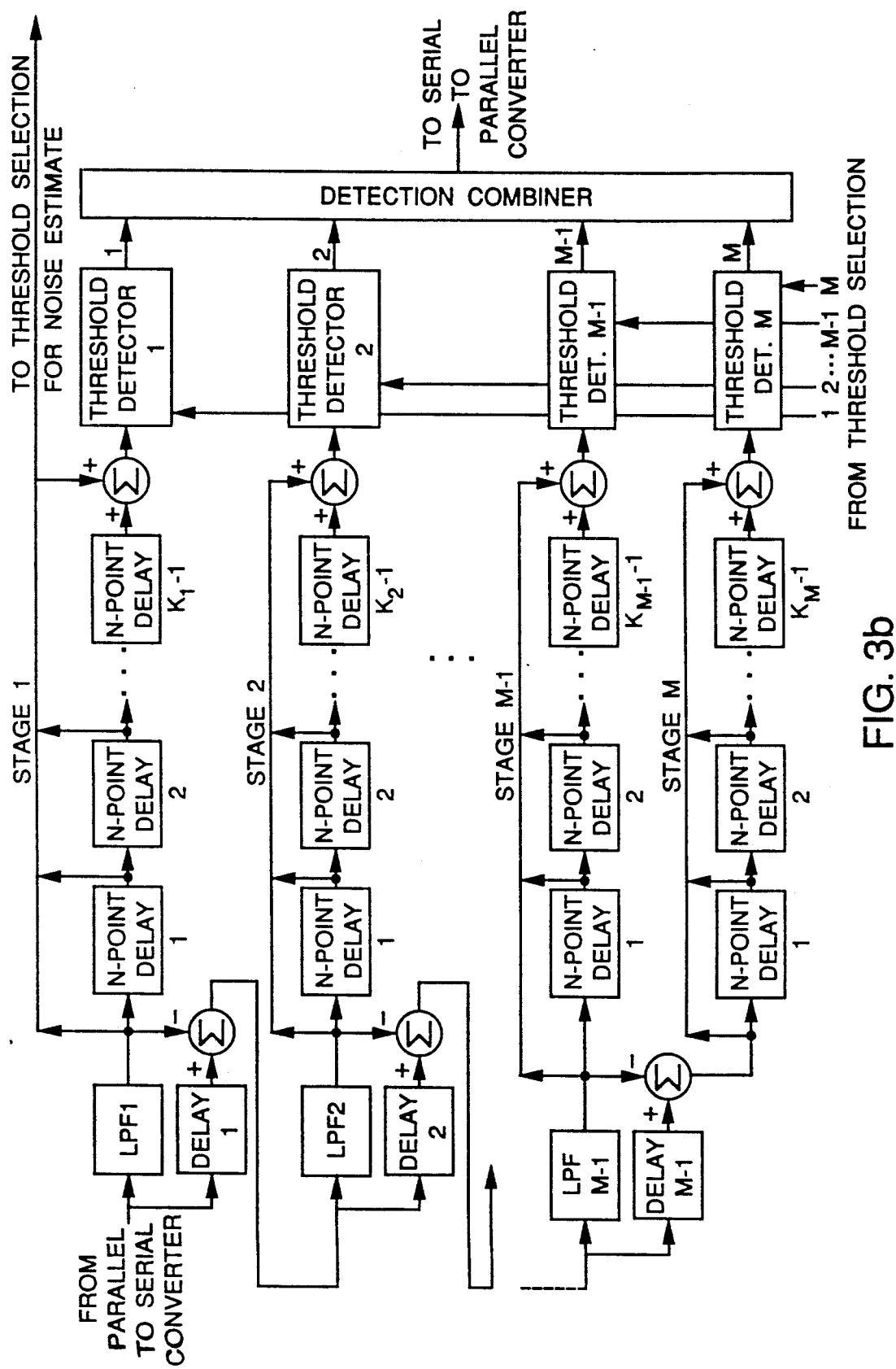
FIG. 3b is a block diagram of the adjustable bandwidth concept signal energy detector apparatus which illustrates in greater detail the detection processor/combiner unit of the present invention.

As with AIM1, the function of the multiple threshold selection unit is to generate a set of thresholds based on any single channel noise estimation technique to achieve a CFAR performance in the detection processor/combiner unit. As indicated in FIG. 3b, the output of the first lowpass filter, LPF1 of stage 1 can be used to aid in the estimation of the noise floor. In the case where the receiver gain and noise figure is known to sufficient accuracy, the thermal noise component of the total noise can be calculated and also aid in determining the overall noise floor.

The detection processor/combiner unit, which is the unique portion of the adjustable bandwidth concept apparatus, is shown in greater detail in FIG. 3b. It consists of M similar processing stages, a threshold detector for each stage, and finally a Detection Combiner which outputs a single N-point binary sequence based on an algorithm which combines the M input binary sequences.

In describing the detailed function of the stages in the adjustable bandwidth concept apparatus detection processor/combiner, the reader is cautioned that terminology will not be exactly correct. This is due to the fact that the input to the detection processor/combiner unit is sampled frequency data rather than sampled time data. Thus, the first lowpass filter (LPF1), although designed as a time-domain finite impulse response (FIR) filter, is not necessarily rejecting the high frequency components of the original complex time signal. The first lowpass filter, LPF1 is however, rejecting the high frequency components of the sequence of N frequency samples which are input to LPF1. In other words, if a periodogram were formed using as input the N-point sequence of frequency data whose amplitude is given in dBm, what is generated is the frequency content of the input sequence. The result of this transformation has been termed the "cepstrum" which is actually a play on the word "spectrum". This and other word analogies have been proposed however, if the above caution is kept in mind while discussing the detection processor/combiner unit, it will not be necessary to introduce strange and possibly confusing terminology. Thus, the first lowpass filter, LPF1 rejects some portion of the upper section of the cepstrum (not spectrum) of the original complex time signal.

Figure 1:
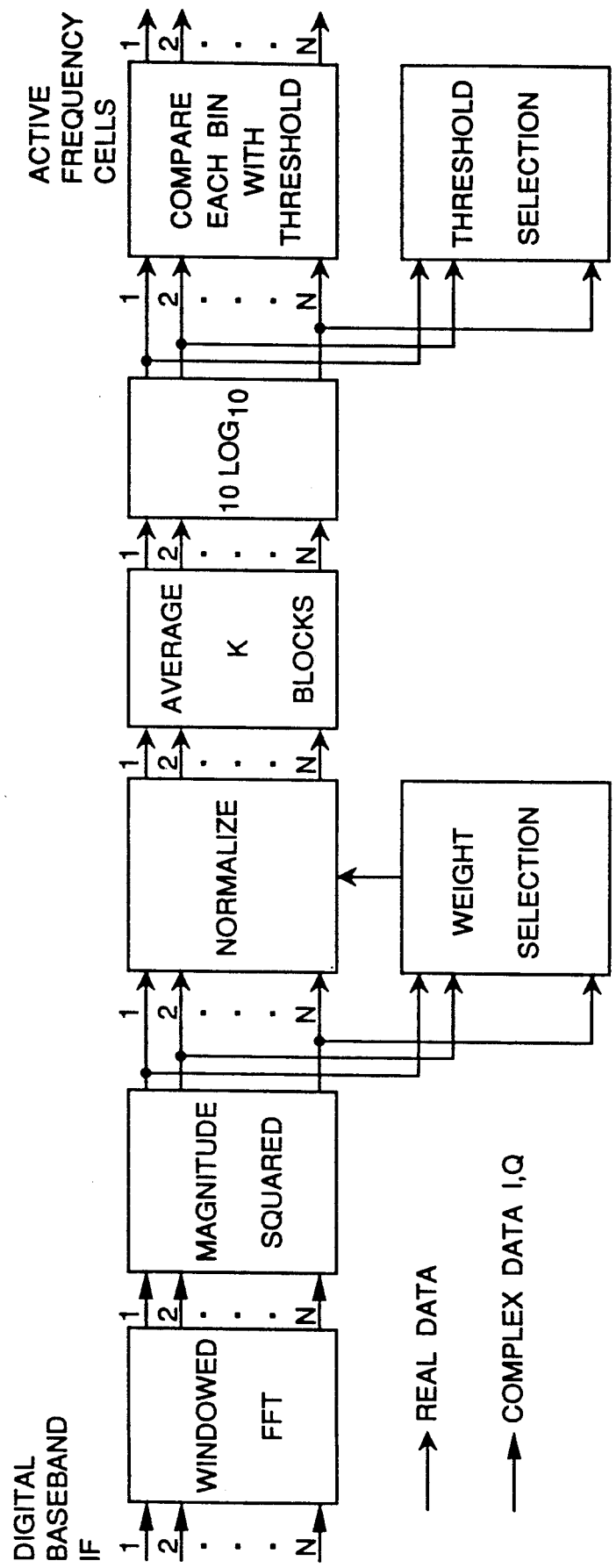
FIG. 1 is a block diagram of a prior art AID detection apparatus using weighted averaging.
Figure 2A:
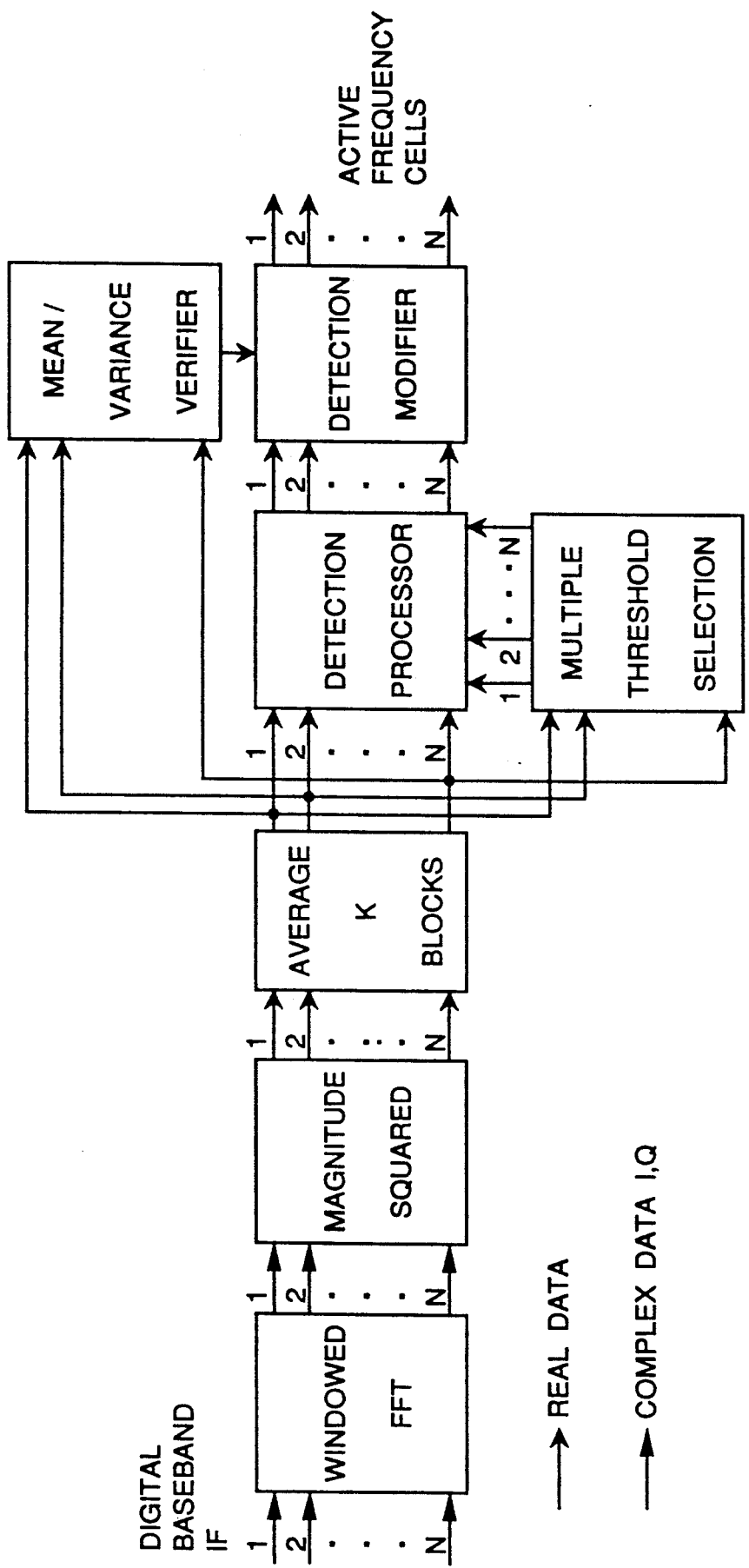
FIG. 2a is a block diagram of a prior art AIM1 signal energy detection apparatus.
Figure 2B:
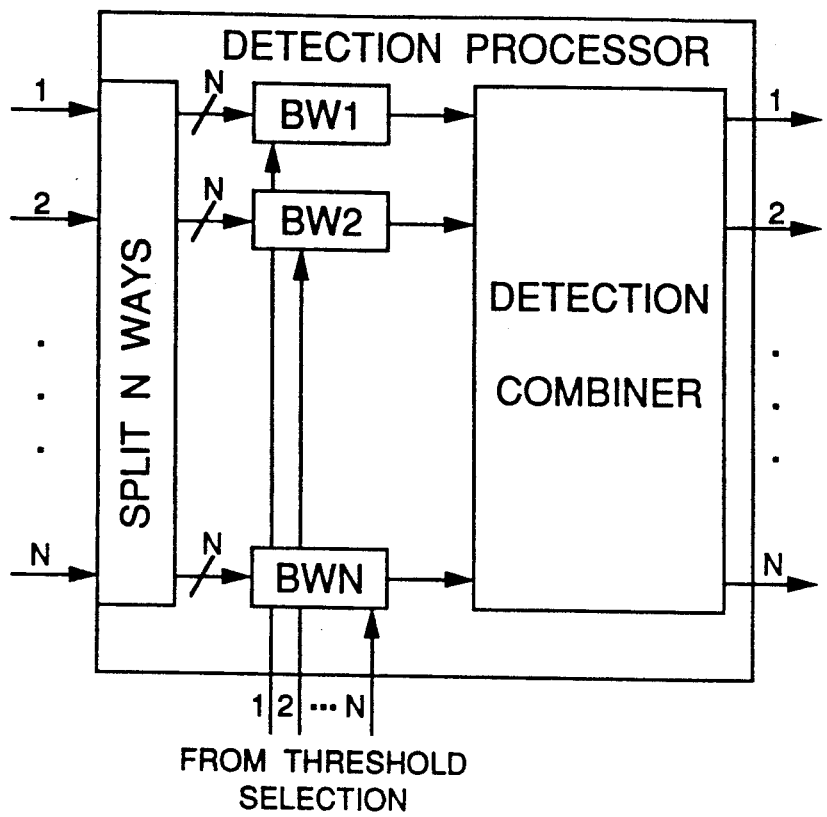
FIG. 2b is a block diagram of a prior art AIM1 detection processor unit.
Figure 2C:
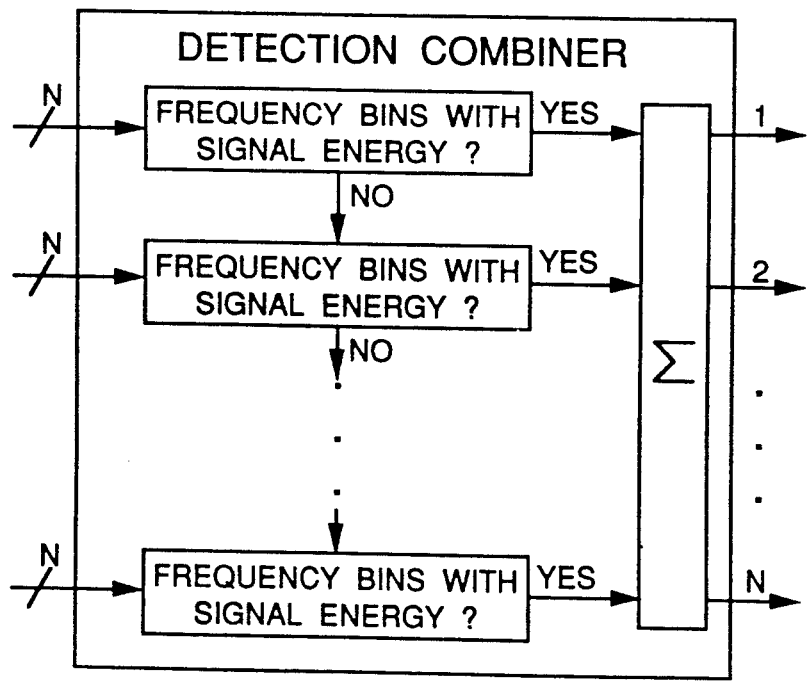
FIG. 2c is a block diagram of a prior art AIM1 detection combiner unit.

In order to gain an understanding of how the detection processor/combiner unit works, it is useful to make a couple of general observations about signals. The first is that signals with rapid transitions in the time domain tend to have wider bandwidths than signal with slow transitions. An example of this is the RF pulse whose 3 dB bandwidth is 1/T Hz, where T is the width of the RF pulse in seconds. Thus as the pulse width decreases the bandwidth increases. The second observation pertains to using the periodogram as an estimate of the power spectrum of a time signal. As discussed earlier, averaging K sets of periodograms of a signal, decreases the variance of the power spectral estimate. For the case where the K periodograms are obtained from K non-overlapping, consecutive and independent sets of data points, the variance of the power spectral estimate is reduced by a factor of 1/K. With these two observations in mind, the functionality of the circuit configuration of FIG. 1b becomes clearer.

After an N-point sequence of power spectral data has been filtered through the LPF, the data is delayed by a series of $(K-1)$ N-point delays, and finally the output of each delay is summed with the output of the LPF. The output of each delay element is initially zero and must be reinitialized to zero after every K sets of N-point sequences have passed through the LPF. Thus the first N points output by the summer will be identical to the first N points output from the LPF, the second set of N points output by the summer will be the sum of the first and second set of N points output by the LPF, and so on until the $K^{th}$ set of points output by the summer will be the sum of the current and $(K-1)$ )previous sets of N points output by the LPF. Other than missing a scaling factor of 1/K, the $K^{th}$ data set output by the summer is the average of k N-point sequences output by the LPF. The advantage to implementing the averaging function in this form is that information is continuously available to the threshold detector unit and subsequently to the detection combiner unit allowing for a detection decision to be made before all K N-point sequences have been processed, although at a higher $P_F$ and/ or lower $P_D$. The function of the threshold detector unit is simply to compare each frequency bin in a set of N points to a predetermined or precalculated threshold, and output a 1 if the threshold is met or exceeded, or output a 0 otherwise. If the threshold remains fixed for a set of K N-point sequences, then $P_F$ will be higher for the first sequence and gradually decrease for each following sequence until the lowest $P_F$ is obtained when processing the $K^{th}$ sequence. Otherwise the threshold could be purposely varied so that every processed sequence results in the same $P_F$. This would be a function of the algorithm used by the threshold detector, and can by design be varied from stage to stage.

Each of the M stages in the detection processor/combiner unit functions as described above, but the lowpass filter used in each stage and the number of averages, K, can vary. Generally speaking, as the stage number increases, the number of averages, K, used by a particular stage decreases. Also the cutoff frequencies of the lowpass filters will typically be designed to increase with increasing stage number. Thus in general, stage (i−1) will have a larger number of N-point delays than stage i and lowpass filter i−1 will have a lower cutoff frequency than lowpass filter i. Since the input to each stage (other than stage 1) is the input to the previous stage minus the output of the lowpass filter of that stage, what remains as input to each stage is whatever was rejected by the lowpass filter of the stage preceding.

The lowpass filter's of each stage are implemented as finite impulse response (FIR) lowpass filters with linear phase and enough filter taps to achieve good stop band attenuation (on the order of 70 to 80 dB). Since linear phase finite impulse response filters have a symmetrical impulse response, the order in which the frequency bins are input to the lowpass filter (e.g. from 0 to $F_s(1-1/N)$ or from $F_s(1-1/N)$ to 0) is irrelevant as long as the input remains consistent and each bit of the binary output of the detection combiner is properly associated with the correct frequency bin. It is necessary however to use discretion in choosing the size, n, of the finite impulse response lowpass filter in relation to the size of the periodogram, N. Since the original complex time signal has been bandlimited by a bandpass filter with a stopband bandwidth equal to $F_s$, both transition regions of this filter will be present in the power spectral estimate. The amount of useful frequency data contained in the periodogram will depend on the shape factor (SF) of the bandpass filter, defined as the ratio of the stopband bandwidth to the 3dB bandwidth of this filter. For example, if the bandpass filter has a SF of 4:3, then the center ¾ of the periodogram will contain useful frequency information, while the first ⅛th and last ⅛th section are the transition regions of the bandpass filter. In the case of 1024 point FFT (i.e. N=1024) this means the first 1024/8=128 and 1st 128 points of the periodogram normally need not be processed. However, to allow the output of each lowpass filter in the various stages of the detection processor/combiner to settle more rapidly and not be impulse-like, these data points can be processed by the lowpass filter as if they contained useful data. In this manner, the entire ¾ central section of the periodogram (e.g. from points 128 to 895) can be used without distortion from the impulse response of the lowpass filter. To take advantage of this fact, the maximum size of the finite impulse response filter, n, should be some fraction of the size of these transition regions; in the example used, some fraction of 128 (e.g. 128/2=64, 128/4=32, etc.). Also of concern is the time delay associated with each lowpass filter. Prior to subtracting the output of a lowpass filter from its input, the input must also be delayed by the same amount introduced by the lowpass filter.

In its simplest form, the function of the detection combiner section of the detection processor/combiner unit is to generate a single binary output based on M binary inputs. One possible combination technique is to simply logically OR all of the M inputs to generate the output. Note that this would require that the detection combiner wait for $(K_{MAX}-1)N/F_s$ seconds before it can output its first N-point binary sequence, where $K_{MAX}$ is the maximum number of averages used among the M stages, and N and $F_s$ are the FFT size and sample rate respectively as before. In general, $K_{MAX}$ will correspond to $K_1$ in stage 1. The binary output represents whether or not detections occurred in the average of the current and $(K_{MAX}-1)$ N-point filtered spectral estimates.

More sophisticated combination techniques can also be used. In order to take advantage of the fact that detection information is available prior to $(K_{MAX}-1)N/F_s$ seconds (since other stages average a smaller number of N-point filtered power spectral estimates) the Detection Combiner can output several N-point binary sequences each corresponding to the value of K for the various stages. For example, if three stages are implemented (i.e. M=3) with $K_1=5$, $K_2=3$, and $K_3=3$ and then valid detection information is available at both $(K_1-1)N/F_s=4N/F_s$ seconds and $(K_3-1)N/F_s=2N/F_s$ seconds. Although the detection combiner will update its output every $N/F_s$ seconds, strictly speaking the overall detection scheme has a time resolution of $K_{MIN}N/F_s$ seconds assuming the average were not overlapped, where $K_{MIN}$ is the smallest number of averages used among the stages. In the example above, $K_{MIN}=K_2=K_3=3$ an therefore a time resolution of $3N/F_s$ seconds is realized.

Although the invention has been described with reference to a particular embodiment, it will be understood to those skilled in the art that the invention is capable of a variety of alternative embodiments within the spirit and scope of the appended claims.

What is claimed is:

1. An adjustable bandwidth concept signal energy detector apparatus comprising in combination:
   a parallel to serial converter receiving a plurality of parallel complex digital signals, said parallel to serial converter converting said parallel complex digital signals to serial frequency data,
   a multiple threshold selection unit receiving said plurality of parallel complex digital signals and generates a set of threshold signals which is based respectively upon single channel noise estimation for said plurality of parallel complex digital signals,
   a detection processor/combiner unit receiving said serial frequency data from said parallel to serial converter, said detection processor/combiner unit receiving said set of threshold signals from said multiple threshold selection unit, said detection processor/combiner unit detecting and processing said serial frequency data respectively with said set of threshold signals to determine signal energy distribution in said serial frequency data, said detection processor/combiner unit generating an N-point set of binary numbers which indicates where signal energy has been detected in said serial frequency data, and,
   a serial to parallel converter receiving said N-point set of binary numbers from said detection processor/combiner unit, said serial to parallel converter converting said N-point set of binary numbers to N-sets of parallel frequency data.

2. An adjustable bandwidth concept signal energy detector apparatus as described in claim 1 wherein said detection processor/combiner unit comprises in combination:
   means for processing said serial frequency data, said processing means comprising a plurality of detection stages each of said detection stages having (1) a lowpass filter, (2) a series of N-point delay units (3) summing means, and (4) a plurality of threshold detectors, said detection stages first filtering said serial frequency data in said lowpass filter (LPF1 to LPFM−1), and delaying said serial frequency data in said series (1 to $K_1-1$) of N-point delay units, and finally summing the output of each delay unit with the output of the stage lowpass filer, the summed outputs being respectively applied to one of said plurality of threshold detectors, the outputs of said threshold detectors comprising said detected energy signals, and a combiner receiving said detected energy signals and combining said detected energy signal to provide said N-point set of binary numbers.

3. An adjustable bandwidth concept signal energy detector apparatus as described in claim 1 wherein said serial data is ordered from lowest frequency to highest and is outputted at a rate equal to N times the input data rate.

4. An adjustable bandwidth concept signal energy detector apparatus as described in claim 1 wherein a plurality of complex digital signals comprise N signals.

5. An adjustable bandwidth concept signal energy detector apparatus as described in claim 1 wherein said serial frequency data comprises N frequency bins which may or may not contain signal energy.

* * * * *